United States Patent [19]

Moraw et al.

[11] 4,131,337

[45] Dec. 26, 1978

[54] COMPARISON READER FOR HOLOGRAPHIC IDENTIFICATION CARDS

[75] Inventors: Roland Moraw; Günther Schädlich, both of Naurod, Fed. Rep. of Germany

[73] Assignee: Hoechst Aktiengesellschaft, Frankfurt am Main, Fed. Rep. of Germany

[21] Appl. No.: 769,345

[22] Filed: Feb. 16, 1977

[30] Foreign Application Priority Data

Feb. 18, 1976 [DE] Fed. Rep. of Germany ....... 2606348
Oct. 25, 1976 [DE] Fed. Rep. of Germany ....... 2648180

[51] Int. Cl.² .................. G03H 1/22; G06K 9/08
[52] U.S. Cl. .................. 350/3.86; 356/71; 356/393
[58] Field of Search ............ 350/3.5, 3.85, 3.86, 350/3.75, 3.78; 356/166, 168, 164, 165, 71; 340/146.3 P, 146.3 Q; 235/61.7 B; 250/550

[56] References Cited

U.S. PATENT DOCUMENTS

| | | | |
|---|---|---|---|
| 2,460,350 | 1/1949 | Hinman | 356/166 |
| 3,481,673 | 12/1969 | Freeman | 356/168 |
| 3,560,093 | 2/1971 | Montone | 356/168 |
| 3,669,521 | 6/1972 | Tait | 350/3.5 |
| 3,743,421 | 7/1973 | Maloney | 356/166 |
| 3,744,917 | 7/1973 | Craig | 356/168 |

*Primary Examiner*—Ronald J. Stern
*Attorney, Agent, or Firm*—Bacon & Thomas

[57] ABSTRACT

Disclosed are a method and apparatus for verifying an identification card or the like having visible indicia thereon and also having on a portion thereof a hologram of said visible indicia as originally placed on the identification card. The method comprises the steps of: producing an optical image of the visible indicia on the identification card; producing a reconstructed image of the hologram on the identification card; projecting the optical image and the reconstructed holographic image, in superimposed register, and either continuously or intermittently, e.g., alternately, upon a common optical image plane; and comparing the images on the image plane. The apparatus comprises suitable optical elements for carrying out these steps using either a single laser light source or such a light source together with a conventional light source.

19 Claims, 7 Drawing Figures

COMPARISON READER FOR HOLOGRAPHIC IDENTIFICATION CARDS

BACKGROUND OF THE INVENTION

The present invention relates to a process for verification of an identification element by direct comparison of an optical image of the identification element with the reconstruction of a hologram formed of the identification element, and in addition it relates to a device for carrying out this process.

This invention is intended to provide increased safety from falsification of identity cards, check cards, credit cards, customer's cards and other identification elements, which are intended to identify their owner.

A known identification and security system uses a hologram in or on an identification element, such as an identity card or other card. The hologram contains information in coded form, which can be re-read under special optical conditions only. This information is recorded by forming a hologram on a suitable recording material using, as the object, the card with the personal data thereon. The hologram is subsequently joined with the card, for example, by inserting the recording material containing the hologram into an aperture provided in the card or by fixing it to the back of the card.

The card is verified in a special reading device. For this purpose, it is inserted into a slot on top of said reading device and thereby assumes the correct position for verification. Inside the reading device a conventional light source is provided producing a direct image of the card, as well as a laser for the reconstruction of the hologram made of the card. On a ground glass or frosted plate put into the front wall of the reading device two images appear adjacent to one another, namely, the direct image of the card produced by means of white light and the red reconstruction of the card resulting from the hologram. By visual comparison of the two images it is possible to determine if the card corresponds to its holographic image.

In said reading device the direct comparison of the two images is rather time-consuming, if any falsification of or tampering with the card is to be detected, since the two images have to be compared characteristic by characteristic. Comparison is made difficult by a difference in color between the reconstruction of the hologram and the direct image of the card. If a number of cards have to be verified in succession, the person performing the check may, after some time, get tired and be subject to a slackening of concentration, because he/she has to change his/her direction of sight several times for each individual card. Thus a possible falsification or tampering may be overlooked.

SUMMARY OF THE INVENTION

It is the object of the present invention to provide a process and a device for the verification of an identification element, in which the visual comparison of the direct optical image with the reconstruction of a hologram made of the identification element can be performed in a time-saver manner and without wearing out or diminishing the power of concentration of the person performing the check.

In accomplishing the objects of the invention, there has been provided a method for verifying an identification element having visible indicia thereon and having on a portion thereof a hologram of the visible indicia as originally placed on the identification element comprising the steps of: producing an optical image of the visible indicia on the identification element; producing a reconstructed image of the hologram on the identification element; projecting the optical image and the reconstructed holographic image, in superimposed register, either continuously (simultaneously) or intermittently, e.g., alternating, upon a common optical image plane; and comparing said images on the image plane. The method may further include the steps of adjusting the color of one of two light sources used to the color of the other and of adjusting the brightnesses of the optical image and of the reconstruction of the hologram to one another.

There has also been provided according to the invention a device for verifying an identification element having visible indicia thereon and having on a portion thereof a hologram of the visible indicia as originally placed on the identification element, the device comprising: means, including a generally planar surface, for displaying an optically produced image on the surface; means, associated with the image displaying means, for producing an optical image of the visible indicia on the identification element; means, associated with the image displaying means, for producing a reconstructed image of the hologram on the identification element; and means for projecting the optical image and the reconstructed holographic image, in superimposed register, upon the planar surface, preferably a ground glass plate.

In one embodiment, the reconstructed holographic image producing means comprises a laser positioned so as to illuminate with a beam the hologram on the identification element and project the reconstructed holographic image on the ground glass plate, and the optical image producing means comprises a conventional light source.

In another embodiment, the optical image producing means and the reconstructed holographic image producing means comprise a laser as a common source of radiation for each. According to one possibility of this embodiment, the laser is positioned to direct a beam therefrom through the hologram of the identification element, whereby a portion of the laser beam passes through the hologram as a laser light of zero order of diffraction and another portion of the laser beam passes through the hologram as laser radiation of first order of diffraction to form the reconstructed holographic image and the optical image projecting means includes means for optically directing a beam from the laser which has passed through the hologram as a laser light of zero order diffraction upon the visible indicia on the identification element. According to another possibility, an imaging lens is positioned in the beam path of the laser, means are positioned in back of said imaging lens (in the beam direction) for splitting the laser beam, whereby a first portion of the beam passes through the beam splitting means undeflected and a second portion of the beam is deflected, and means are also provided in association with the beam splitting means for reflecting the deflected beam portion onto the visible indicia on the identification element.

Preferably, the device also includes means, positioned between the displaying means and the projecting means, for intermittently interrupting projection of at least one of the images upon the planar surface, e.g., a beam chopper.

Further objects, features and advantages of the invention will become apparent from the following detailed description of preferred embodiments, when considered together with the accompanying figures of drawing.

BRIEF DESCRIPTION OF THE DRAWINGS

In the drawings.

Identical elements incorporated in the devices are marked by the same reference number throughout the figures.

DETAILED DESCRIPTION OF PREFERRED EMBODIMENTS

According to the invention, the foregoing task is solved by projecting the direct optical image and the reconstruction of the hologram in register upon a common optical image plane.

The device, upon which the invention is based, is equipped with a conventional light source for the production of an optical image of the identification element, composed of a section containing the information and the hologram; further, there is a laser for reconstruction of the hologram formed of the identification element, an input station for the identification element and a ground glass plate as projection plane for the optical image and the reconstruction of the hologram. As compared to known devices, the device for carrying out the process according to the present invention is characterized in that the hologram is positioned in the beam path of the laser and is illuminated by the reference beam of the laser, projecting the reconstructed image of the identification element onto the ground glass plate, the beam path of the conventional light source being deviated in the direction of the information section of the identification element by means of a first reflector, with a semi-transparent mirror provided between the first reflector and the identification element, so that, by way of a second and a third reflector, the reflected image of the information section appears on the ground glass plate in register with the reconstructed image of the hologram.

By the inventive method and by the proposed device, the following advantages are achieved: In case of any discrepancy between the coinciding images, which are alternately projected upon each other, the change of image is immediately distinguished without having a view two images adjacent to each other, as in the known device. In addition, an adjustment of brightness and color of the two images further simplifies the verification.

In a further embodiment of the device according to the invention, the setup is simplified in such a way that a color adjustment of the reconstructed hologram to the optical image of the identification element is no longer necessary. In this case, the laser is not only used for reconstructing the hologram, but also serves as a source of radiation for the production of an optical image of the identification element which appears on the ground glass plate in register with the reconstruction of the hologram.

For this purpose, a beam of the laser used to form the optical image of the hologram, after it has passed the hologram, is in the form of laser light of zero order of diffraction, spread by optical deviating elements and is incident upon the information section of the identification element of which an optical image is to be produced. Preferably, plane mirrors inclined to the horizontal are used as optical deviating elements; however, it is also possible to use fiber optics and optical lenses.

The above-described embodiment of the invention yields the advantage that, without additional means for a color adjustment, the reconstruction of the hologram as well as the optical image are produced by one radiation source only, i.e., the laser; hence, the conventional source of light and its electrical supply unit are no longer required.

Figure 1:
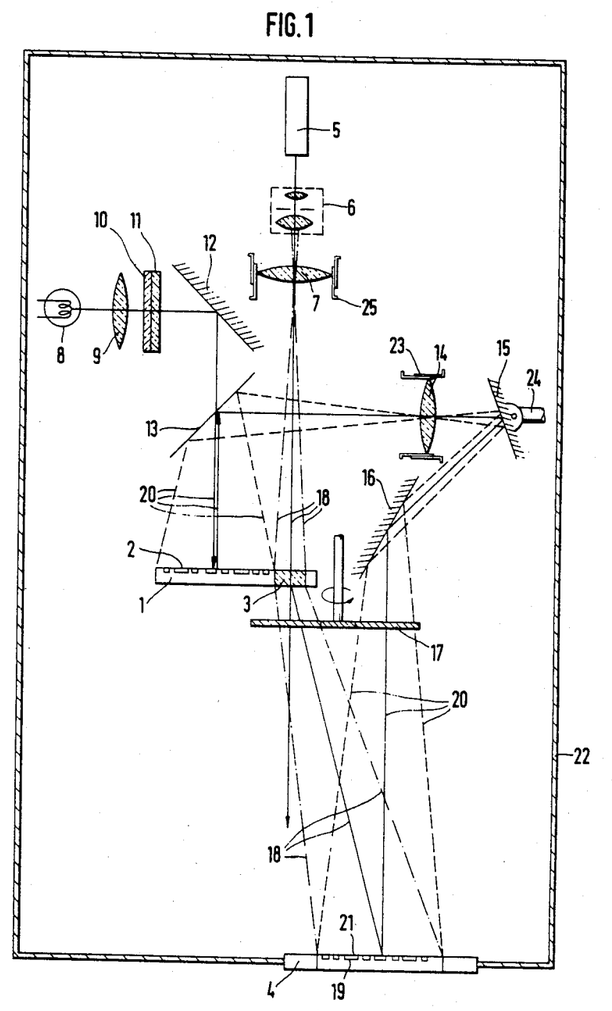
FIG. 1 is a diagrammatic top view of a device for carrying out the process according to the invention for verification of an identification element.

Turning now to the drawings, FIG. 1 is a diagrammatic view of one embodiment of the device according to the invention. The device is arranged in a casing 22 and comprises a laser 5 for reconstructing a hologram 3, and a conventional light source 8 for producing an image of an identification element 1 on a ground glass plate 4 fitted into one of the side walls of the casing 22.

The light of the laser 5 first passes a known arrangement 6 with pinhole and beam spreader and an imaging lens 7. The beam path of the laser 5 is marked by the positioning number 18. The laser light is incident on the hologram 3 incorporated in the identification element 1 which is positioned in the device parallel to the ground glass plate 4. The hologram 3 represents the holographic image of the important personal data of the owner of the identification element, which data are compiled in an information section 2 of the identification element 1. The latter may be a check card, a credit card, an identity card or a customer's card, which in its information section 2 contains, among other things, the account number and/or signature and, if required, a photograph of the owner of the card. The hologram 3 is inserted into the identification element 1 in such a way that a true-to-side image (non-mirror image) of the information section 2 is produced when the hologram is reconstructed on the ground glass plate 4.

For reconstruction, the hologram 3 is irradiated by the light (i.e., by the reference beam) of the laser 5, which has passed the arrangement 6 and the imaging lens 7. When the laser light passes the hologram 3, the amplitude and the phase of the object waves stored in the hologram are reconstructed so that the image 19 of the object appears three-dimensional and is projected upon the ground glass plate 4.

The conventional light source 8, e.g., a bulb, serves to episcopically represent the identification element 1. It is preferably arranged at right angles to the laser 5. The beam path of the light source 8, which is deviated several times, is marked by the reference numeral 20. After having passed a condenser lens 9, a color filter 10 and a neutral-density glass filter 11, the light rays emitted by the source 8 are incident upon a first reflector 12 deflecting them in the direction of the information section 2 of the identification element 1. The color filter 10 enables a color adjustment of the light of the laser 5 to the light of the light source 8. For a helium-neon-laser, a red color filter 10 is chosen, since the radiation emitted by such lasers is in the visible red range, as is known. The neutral-density glass filter 11 is to adjust the brightness of the direct optical image 21 to match that of the reconstructed image 19 of the hologram 3 on the ground glass plate 4. Other means for adjusting the intensity may also be used, such as pairs of optical polarizers. The brightness can also be adjusted by controlling the voltage of the bulb 8. If a high-power laser is used, the adjustment of intensity is, e.g., effected by polarizers disposed in the laser beam.

Between the first reflector 12 and the identification element 1 is povided a semi-transparent mirror 13 which transfers the reflected image of the information section 2 of the identification element 1 to the ground glass plate 4 by way of an imaging lens 14, a second reflector 15 and a third reflector 16. The imaging lens 14 positioned between the semi-transparent mirror 13 and the second reflector 15 is adjustable by means of an adjusting device 23, so that it is possible to change the relationship between object distance and image distance of the information section 2 of the identification element 1 to such an extent that on the ground glass plate 4 the optical image is in register with the reconstructed image 19 of the hologram 3. Also, it is possible to provide an adjusting device 24 for the second reflector 15, in order to be able to change its position and thus project the optical image 21 with adequate sharpness onto the ground glass plate 4. The lens 7 arranged in the laser beam, is similarly supported in an adjusting device 25, enabling a change of the image scale of the reconstructed hologram.

In the device shown in FIG. 1 a beam chopper 17 is disposed upstream of the ground glass plate 4. By means of this beam chopper it is possible to observe on the ground glass in alternating fashion the direct optical image 21 and the reconstructed image 19 of the hologram 3. The beam chopper 17 is, for example, a sector disk (see FIG. 3) positioned in the beam path 18 of the reference beam of the laser 5 after it has passed the hologram 3, as well as in the beam path 20 of the conventional light source 8 after deflection at the third reflector 16. In order to interrupt the two beam paths 18 and 20, the beam chopper 17 preferably rotates at a frequency of 0.5 to 50 cycles per second; however, frequencies exceeding 50 cps are also feasible.

When the beam chopper 17 rotates, the reconstructed image 19 of the hologram 3 and the direct optical image 21 of the identification element 1 appear alternately on the ground glass plate. In case of an absolute correspondence of the reconstructed image 19 and the optical image 21, it is impossible to perceive the alternation of images. If, however, the information contained in the two images differs, e.g., due to tampering with or falsification of a number on the identification element 1, the change of the number in the otherwise stable and sharp image is immediately noticed by the person performing the check. At a low alternation frequency of 0.5 to 10 cps the change from one number to another is easily detected. With higher frequencies, the image detail gets increasingly blurred in the non-coinciding areas, and it is noticed that, e.g., two numbers, one of which has been falsified, appear simultaneously and super-imposed.

Figure 2:
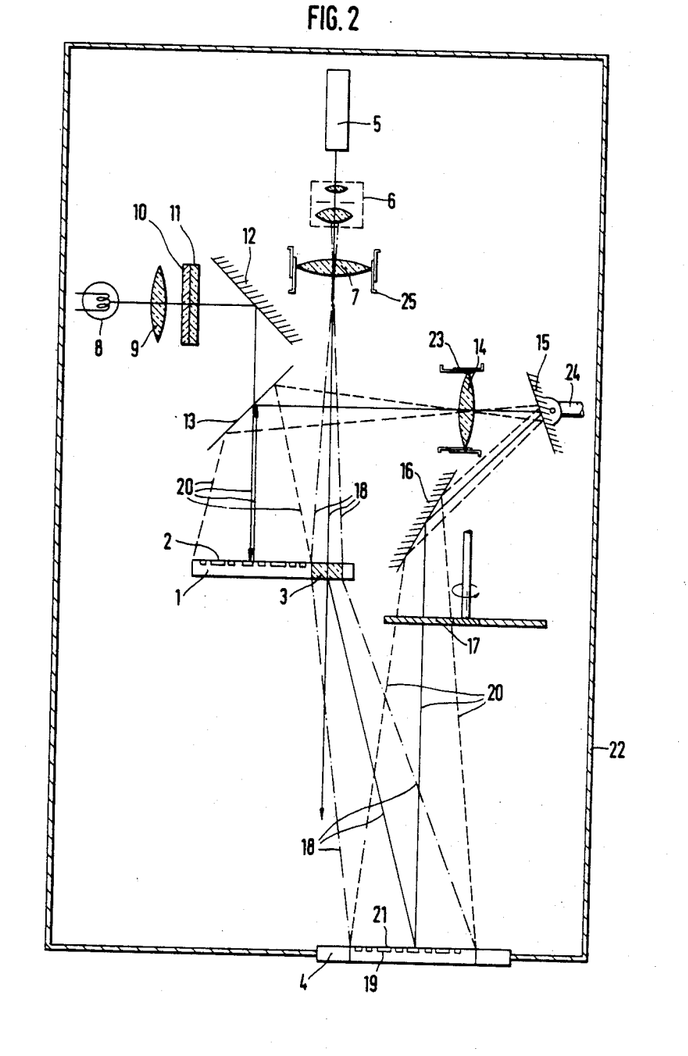
FIG. 2 shows a slightly modified embodiment as compared to FIG. 1.

In the embodiment according to FIG. 2, the beam chopper 17 is disposed in the beam path 20 of the conventional light source 8 only. The direct optical image 21 is thus periodically interrupted in accordance with the rotation frequency of the beam chopper 17, whereas the reconstructed image 19 is continuously projected on the ground glass plate 4. When the reconstructed image 19 and the optional image 21 are compared in this manner, two super-imposed images appear as one stable image, provided they are entirely identical. Any tampering with the identification element 1 results in an image which is blurred in the falsified area and is thus detected without difficulty.

As a matter of course, it is also possible to arrange the beam chopper 17 in the beam path 18 of the laser 5 only (although this embodiment is not shown in the drawings). In this case, the reconstructed image 19 is periodically interrupted, while the direct optical image 21 is continuously projected onto the ground glass plate 4. Any tampering with the identification element 1 is then detected as explained above.

Figure 3:
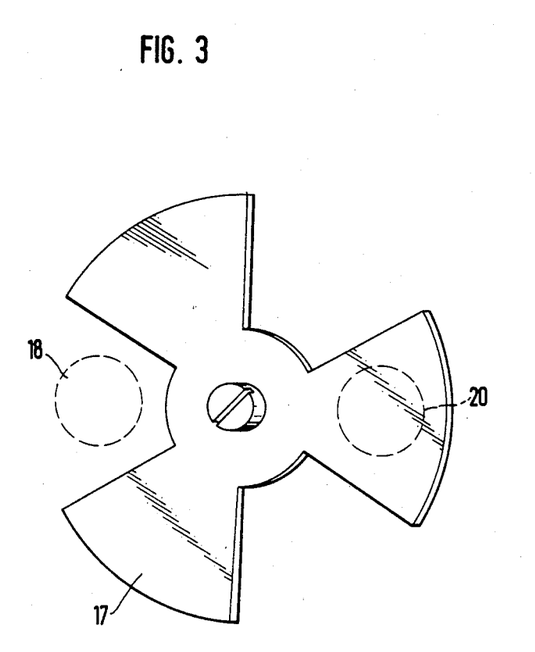
FIG. 3 is a detailed perspective view of a beam chopper incorporated into the device according to the invention.

FIG. 3 is a detailed view of the beam chopper 17 which may be a sector disk, as already mentioned. Other periodically operating interrupting means, such as periodically energized, electronically controlled shutters, are also suited in interrupt the beam paths 18 and/or 20.

The adjusting device 23 provided at the imaging lens 14 for changing the image scale and the adjusting device 24 at the second reflector 15 for adjusting the position of the image need by actuated only if variations occur during forming and inserting the hologram into the respective identification element, i.e., in cases where work under nonvarying conditions is not always possible. Generally, it may be assumed that forming of the hologram as well as insertion of the hologram into the identification element 1 and positioning of the identification element 1 in the device are carried out under unchanging conditions so that readjustment by means of the adjusting devices 23 and 24 will only rarely be necessary.

Figure 4:
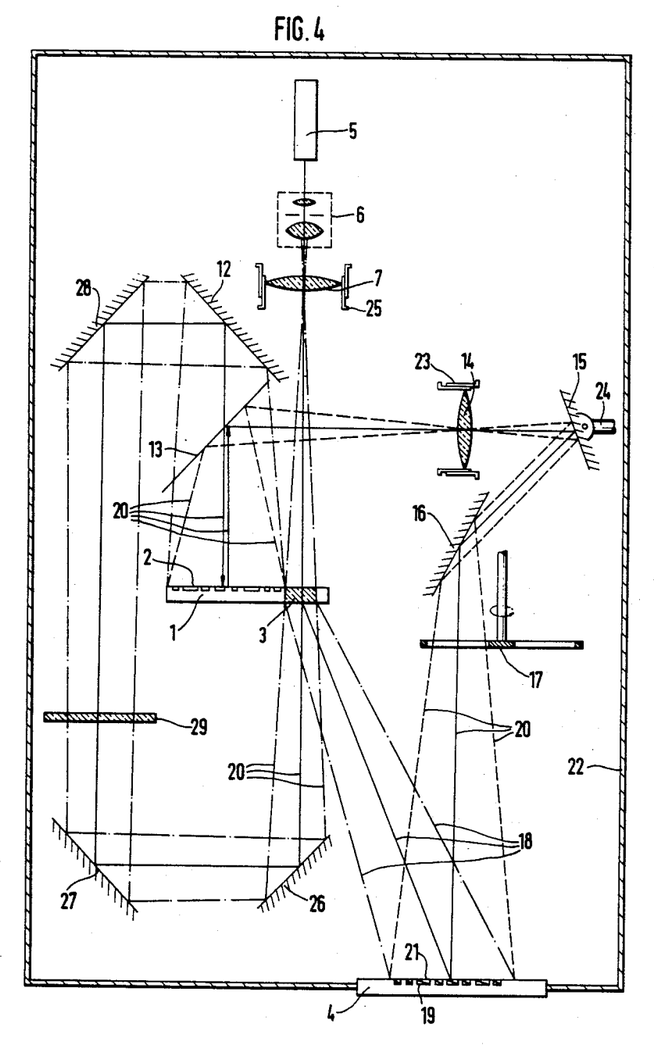
FIG. 4 is a diagrammatic top view of a device according to the invention for verification of an identification element comprising a laser as the only source of radiation.

In the embodiment of the invention shown in FIG. 4, the laser 5 is the only source of radiation. It serves to reconstruct the hologram 3 and it is also used to produce an image of the identification element 1 on the ground glass plate 4.

The light of the laser 5 traverses the known arrangement 6, comprising a pinhole and beam spreader, and is incident upon the hologram 3. While passing the hologram 3, the radiation of the laser is split into the beam 20 of zero order of diffraction, which is used to porduce an optical image of the identification element 1, and into the beam 18 which reconstructs the hologram 3 on the ground glass plate 4. The beam 18 represents the first order of diffraction of the laser light. Generally, the percentage of light of zero order of diffraction exceeds the percentage of light of the first order of diffraction. At a position, where the light rays of zero order of diffraction and the light rays of the first order of diffraction do not at all intersect or only slightly intersect, the beam 20 of zero order of diffraction is deflected, and by means of several optical deviating elements it is guided onto the identification element 1. That is, when the beam 20 has passed the hologram 3, it strikes a plane mirror 26 which is inclined to the horizontal. By this mirror the beam is deflected onto another inclined plane mirror 27 and is then reflected, in a direction approximately parallel to the direction of incidence of the laser light, onto a third inclined plane mirror 28. Between the two plane mirrors 27 and 28 a beam attenuator 29 is positioned in order to adjust the intensity of the laser light of zero order of diffraction to the laser light of the first order of diffraction. From the plane mirror 28, the beam 20 is guided to another inclined plane mirror 12 and is then deflected in the direction of the identification element 1. The semi-transparent mirror 13 is positioned between the identification element 1 and the plane mirror 12. From the plane mirror 12, the spread laser light makes its way to the information section 2 of the identification element 1, and from there it is reflected in the direction of the semi-transparent mirror. The reflected image of the information section 2 is projected onto the ground glass plate 4 via the imaging lens 14, which is adjustable by means of the adjusting device 23, and via the two reflectors 15 and 16, as described in the embodiment according to FIG. 1.

The beam chopper 17 positioned upstream of the ground glass plate 4 interrupts the path of the beam 20 only.

Figure 7:
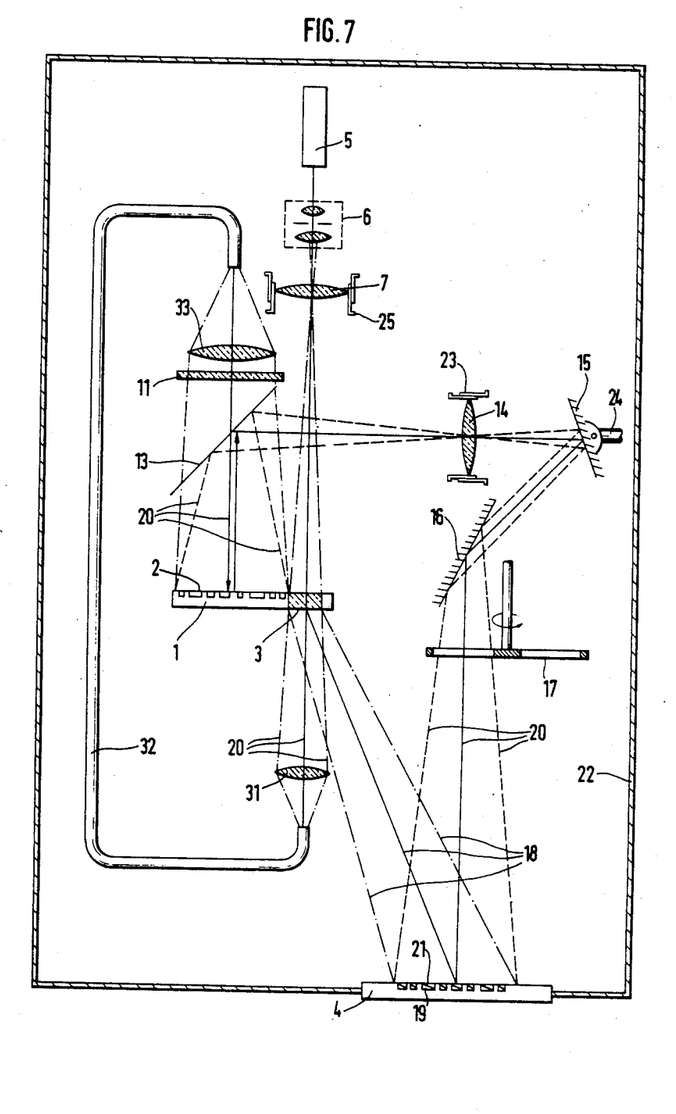
FIG. 7 is a diagrammatic top view of an embodiment of the invention, modified as compared to the device in FIG. 4, comprising glass-fiber optics and optical lenses.

In the embodiment according to FIG. 7, optical lenses 31 and 33 and a glass-fiber optics arrangement 32 may be used as optical deflecting elements instead of the plane mirrors 26,27,28 and 12 which are inclined to the horizontal in FIG. 4. The beam 20 passing the hologram 3 is collected by the lens 31 and enters the glass fiber optics device 32. Upon leaving the glass-fiber optics device 32, the beam 20 is spread again by the lens 33 so that it covers the width of the information section 2.

The remainder of the elements incorporated in the device of FIG. 7 are generally arranged as shown in FIG. 4, i.e., the remaining beam path corresponds to the beam path in FIG. 4.

Figure 5:
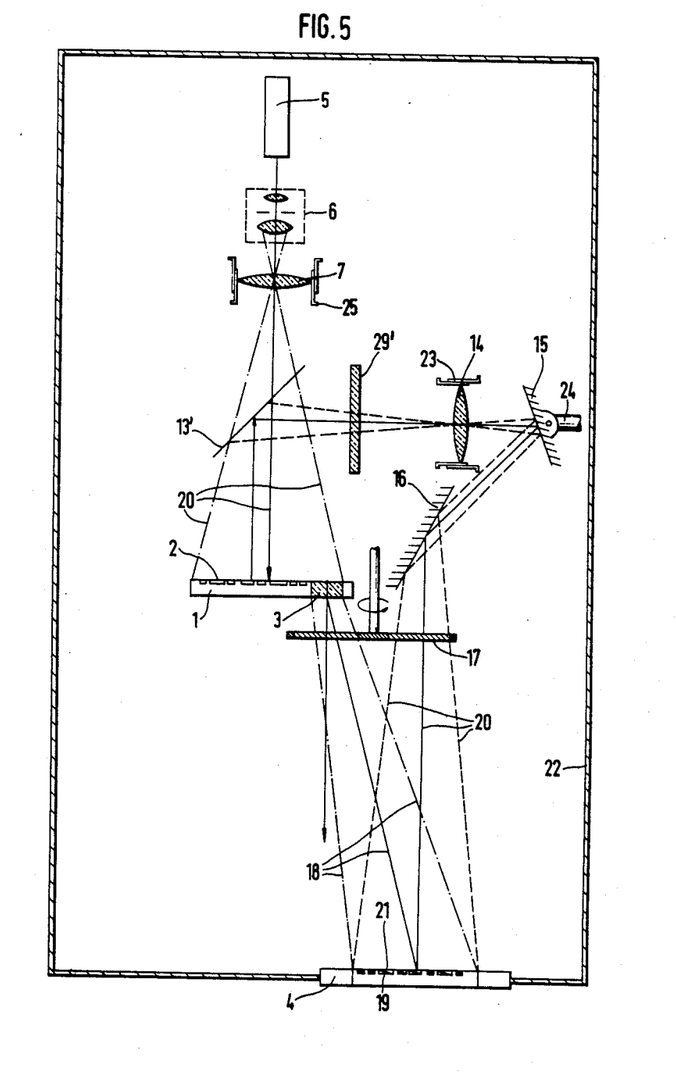
FIG. 5 is a diagrammatic top view of a device modified as compared to FIG. 4.

In the embodiment according to FIG. 5, the beam 20 of the laser 5 is spread by the known arrangement 6, comprising a pinhole and beam spreader, and by the following imaging lens 7, in order to cover the total width of the information section 2 plus the hologram 3. The identification element is thus entirely illuminated. After having passed the hologram 3, the beam 18 is subject to a diffraction of the first order and provides the reconstruction image 19 on the ground glass plate 4. In this embodiment of the invention, the identification element 1 is centrosymmetrically positioned with respect to the central ray of the beam 20. The image of the illuminated information section 2 is reflected onto a semi-transparent mirror 13′ and, as described for the embodiment according to FIG. 4, it is deviated by this mirror in the direction of the imaging lens 14 and of the two reflectors 15 and 16, so that an optical image 21 also appears on the ground glass plate 4. Advantageously, a beam attenuator 29′ is disposed between the semi-transparent mirror 13′ and the imaging lens 14.

The beam chopper 17 is positioned upstream of the ground glass plate 4 and interrupts the beam paths of the beam 18 as well as of the beam 20.

Figure 6:
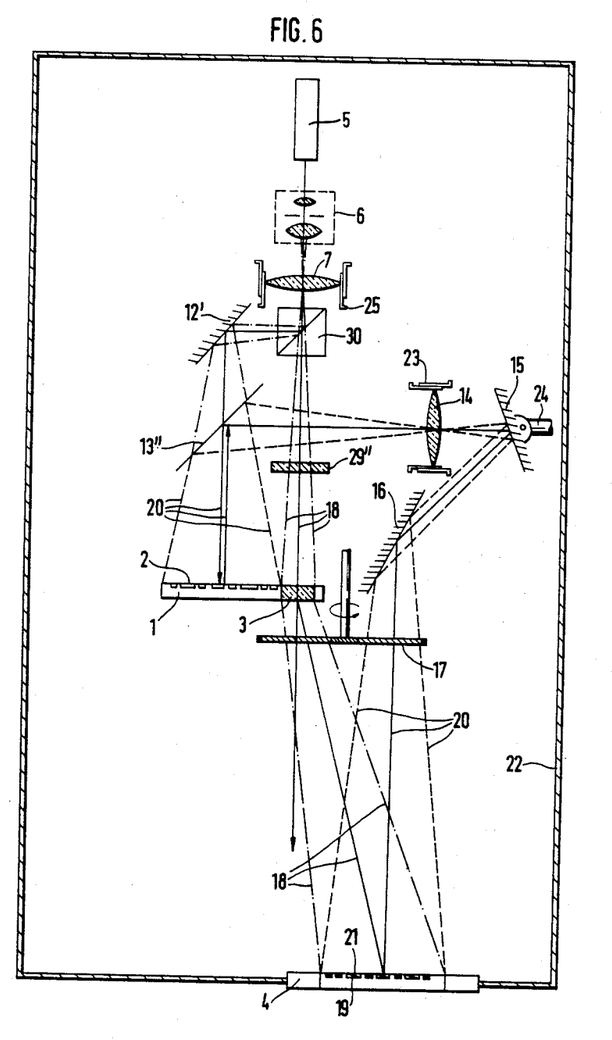
FIG. 6 shows a device according to the invention, which is slightly modified as compared to FIG. 5.

In the embodiment of the invention according to FIG. 6, the imaging lens 7 is followed by a beam splitter 30 splitting up the laser radiation so that part of it, i.e., the beam 18, passes undeflected in the direction of the hologram 3, whereas another part is deviated onto a reflector 12′ reflecting it in the form of the beam 20 in the direction of the information section 2. The beam 20 is spread to such an extent that the entire width of the information section 2 is illuminated. As mentioned before, a semi-transparent mirror 13″ is disposed between the reflector 12′ and the identification element 1. The reflected image of the information section 2 is incident upon the semi-transparent mirror 13″ and, as already described for FIGS. 4 and 5, it is conveyed via the imaging lens 14 and the reflectors 15 and 16 to the ground glass plate 4 to form the optical image 21 of the information section 2.

Similar to the embodiment according to FIG. 5, the beam chopper 17 is disposed upstream of the ground glass plate 4 and, when rotating, interrupts the beam 20 as well as the beam 18.

In order to widen the angle of aperture of the beam 20, it may be of advantage to dispose another lens (not shown in the drawing) between the beam splitter 30 and the mirror 13″.

If a beam splitter 30 of equal intensity is used, the beam attenuator 29″ for balancing the brightness of the two images on the ground glass 4 is preferably arranged in the beam path of the reconstructing beam 18, and it may be positioned between the beam splitter 30 and the hologram 3.

What is claimed is:
1. A device for verifying an identification element having visible indicia thereon and on an adjacent portion thereof having a transmission hologram of said visible indicia as originally placed on the identification element, said device comprising:
 (a) means for illumination of both said hologram and said visible indicia from the same side of said identification element;
 (b) means, including a generally planar surface, for displaying an optically produced image on said surface;
 (c) means, associated with said image displaying means, for producing an optical image of the visible indicia on the identification element;
 (d) means associated with said image displaying means, for producing a reconstructed image of the hologram on the identification element;
 (e) means for projecting said optical image and said reconstructed holographic image, in superimposed register, upon said planar surface;
 wherein said optical image producing means and said reconstructed holographic image producing means comprise a laser as a common source of radiation for each; and
 wherein said optical image projecting means comprises means including a beam attenuator for optically directing a beam from said laser which has passed through said hologram as a laser light of zero order diffraction upon the visible indicia on the identification element and for adjusting the intensity of said laser light of zero order of diffraction for equalizing the intensity of the optical image to the intensity of the laser radiation of the first order of diffraction forming the reconstructed holographic image on said planar surface.

2. The device according to claim 1, wherein said optical directing means further comprises a plurality of optically aligned plane mirrors inclined to the horizontal.

3. The device according to claim 1, further comprising a pinhole and beam spreader, and an imaging lens placed in front of the laser to spread the beam of the laser so that it covers the entire width of the visible indicia plus the hologram on the identification element, whereby only a portion of the laser beam passes through the hologram.

4. The device according to claim 1, further comprising means positioned in front of said planar surface for intermittently interrupting projection of both said optical image and said reconstructed holographic image upon said planar surface.

5. The device according to claim 1, wherein said planar surface is a ground glass plate.

6. A device for verifying an identification element having visible indicia thereon and on an adjacent portion thereof having a transmission hologram of said visible indicia as originally placed on the identification element, said device comprising:
(a) means for illumination of both said hologram and said visible indicia from the same side of said identification element;
(b) means, including a generally planar surface, for displaying an optically produced image on said surface;
(c) means, associated with said image displaying means, for producing an optical image of the visible indicia on the identification element;
(d) means, associated with said image displaying means, for producing a reconstructed image of the hologram on the identification element;
(e) means for projecting said optical image and said reconstructed holographic image, in superimposed register, upon said planar surface;
(f) means for adjusting the brightness of said optical image and of the reconstruction of said hologram equal to each other;
wherein said optical image producing means and said reconstructed holographic image producing means comprise a laser as a common source of radiation for each; and
wherein said laser is positioned to direct a beam therefrom through the hologram of the identification element, whereby a portion of the laser beam passes through the hologram as a laser light of zero order of diffraction and another portion of the laser beam passes through the hologram as laser radiation of first order of diffraction forming said reconstructed holographic image; and
wherein said optical image projecting means comprises means for optically directing a beam from said laser which has passed through said hologram as a laser light of zero order diffraction upon the visible indicia on the identification element comprising a semi-transparent mirror positioned between the optical directing means and the indicia of the identification element, an imaging lens positioned in the path of light reflected by said semi-transparent mirror, a first reflecting means for receiving light from said imaging lens, a second reflecting means for transferring light from said first reflecting means to said planar surface and means positioned between said second reflecting means and said planar surface for intermittently interrupting projection of said optical image upon said planar surface.

7. The device according to claim 6, further comprising a semi-transparent mirror positioned above the identification element in the path of the laser beam, an imaging lens positioned to receive light reflected from said semi-transparent mirror, and for adjusting the location of said imaging lens.

8. The device according to claim 6, wherein said optical directing means comprises a plurality of optically aligned plane mirrors inclined to the horizontal.

9. The device according to claim 6, further comprising a pinhole and beam spreader, and an imaging lens placed in front of the laser to spread the beam of the laser so that it covers the entire width of the visible indicia plus the hologram on the identification element, whereby only a portion of the laser beam passes through the hologram.

10. The device according to claim 6, wherein said planar surface is a ground glass plate.

11. A device for verifying an identification element having visible indicia thereon and on an adjacent portion thereof having a transmission hologram of said visible indicia as originally placed on the identification element, said device comprising:
(a) means for illumination of both said hologram and said visible indicia from the same side of said identification element;
(b) means, including a generally planar surface, for displaying an optically produced image on said surface;
(c) means, associated with said image displaying means, for producing an optical image of the visible indicia on the identification element;
(d) means, associated with said image displaying means, for producing a reconstructed image of the hologram on the identification element;
(e) means for projecting said optical image and said reconstructed holographic image, in superimposed register, upon said planar surface;
(f) means for adjusting the brightnesses of said optical image and of the reconstruction of said hologram equal to each other;
wherein said optical image producing means and said reconstructed holographic image producing means comprise a laser as a common source of radiation for each; and
wherein said laser is positioned to direct a beam therefrom through the hologram of the identification element, whereby a portion of the laser beam passes through the hologram as a laser light of zero order of diffraction and another portion of the laser beam passes through the hologram as laser radiation of first order of diffraction forming said reconstructed holographic image; and
wherein said optical image projecting means comprises a first lens in the path of said laser light of zero order diffraction, a second lens above the identification element and a fiber optic element extending between said first and second lenses for optically directing a beam from said laser which has passed through said hologram upon the visible indicia of the identification element.

12. The device according to claim 11, wherein said planar surface is a ground glass plate.

13. A device for verifying an identification element having visible indicia thereon and on an adjacent portion thereof having a transmission hologram of said visible indicia as originally placed on the identification element, said device comprising:
(a) means for illumination of both said hologram and said visible indicia from the same side of said identification element;
(b) means, including a generally planar surface, for displaying an optically produced image on said surface;
(c) means, associated with said image displaying means, for producing an optical image of the visible indicia on the identification element;

(d) means, associated with said image displaying means, for producing a reconstructed image of the hologram on the identification element;

(e) means for projecting said optical image and said reconstructed holographic image, in superimposed register, upon said planar surface;

(f) means for adjusting the brightnesses of said optical image and of the reconstruction of said hologram equal to each other;

wherein said reconstructed holographic image producing means comprises a laser position so as to illuminate with a beam the hologram on the identification element and project the reconstructed holographic image on said planar surface and wherein said optical image producing means comprises a conventional light source; and wherein said optical image projecting means comprises a plurality of reflecting means for reflecting said optical image to said planar surface, said plural reflecting means including a first reflecting means positioned above the identification element for deflecting light from said light source to the identification element, a semi-transparent mirror located between said first reflecting means and the identification element, a second reflecting means for receiving the optical image from the second reflecting means to said planar surface, and further comprising a sector disc rotating at a frequency of from about 0.05 – 50 cps, said sector disc being disposed in front of the planar surface and positioned in the beam path of the laser after the beam has passed through the hologram and also in the image beam path of the conventional light source which has been deflected by said third reflecting means.

14. The device according to claim 13, further comprising a condenser lens, a color filter and wherein said means for adjusting the intensity of the optical image equal to the intensity of the reconstructed holographic image is placed in the order mentioned between the conventional light source and the first reflector.

15. The device according to claim 14, wherein the color filter is permeable to the color corresponding to the color of the laser light.

16. The device according to claim 14, wherein said intensity adjusting means comprises a neutral-density glass filter, which adjusts the brightness of the optical image equal to the brightness of the reconstructed holographic image.

17. The device according to claim 13, further comprising a pinhole and beam spreader, and an imaging lens positioned serially in the beam of said laser.

18. The device according to claim 13, further comprising an imaging lens positioned between the semi-transparent mirror and the second reflecting means in the beam path of the conventional light source and means for adjusting the position of said imaging lens.

19. The device according to claim 13, wherein said planar surface is a ground glass plate.

* * * * *

UNITED STATES PATENT AND TRADEMARK OFFICE
CERTIFICATE OF CORRECTION

PATENT NO. : 4,131,337
DATED : December 26, 1978
INVENTOR(S) : Roland Moraw and Gunther Schadlich It is certified that error appears in the above-identified patent and that said Letters Patent are hereby corrected as shown below:

Column 1, line 61, change "time-saver" to --time-saving--.

Column 6, line 26, change "in" to --to--;
         line 33, after "element" insert --1--; and
         line 51, change "porduce" to --produce--.

Column 9, line 64, after "and" insert --means--.

Signed and Sealed this

*Twenty-fifth* Day of *November 1980*

[SEAL]

*Attest:*

SIDNEY A. DIAMOND

*Attesting Officer*      *Commissioner of Patents and Trademarks*